(12) United States Patent
Huang

(10) Patent No.: US 9,797,107 B1
(45) Date of Patent: Oct. 24, 2017

(54) HYDROELECTRIC POWER GENERATING APPARATUS

(71) Applicant: Kuo-Chang Huang, Tainan (TW)

(72) Inventor: Kuo-Chang Huang, Tainan (TW)

( * ) Notice: Subject to any disclaimer, the term of this patent is extended or adjusted under 35 U.S.C. 154(b) by 0 days.

(21) Appl. No.: 15/606,711

(22) Filed: May 26, 2017

(30) Foreign Application Priority Data

May 27, 2016 (TW) .............................. 105116616 A

(51) Int. Cl.
| | | |
|---|---|---|
| *E02B 9/04* | (2006.01) | |
| *F03B 13/08* | (2006.01) | |
| *F03B 17/06* | (2006.01) | |
| *E02B 8/06* | (2006.01) | |
| *E02B 9/00* | (2006.01) | |
| *E02B 9/02* | (2006.01) | |

(52) U.S. Cl.
CPC ................. *E02B 9/04* (2013.01); *E02B 8/06* (2013.01); *F03B 13/08* (2013.01); *F03B 17/061* (2013.01); *E02B 9/00* (2013.01); *E02B 9/02* (2013.01); *F03B 17/06* (2013.01); *F05B 2220/706* (2013.01)

(58) Field of Classification Search
CPC ..... E02B 8/06; E02B 9/00; E02B 9/04; E02B 9/0204
See application file for complete search history.

(56) References Cited

U.S. PATENT DOCUMENTS

| | | | | |
|---|---|---|---|---|
| 616,212 | A * | 12/1898 | Thornton | .................. E02B 8/06 251/147 |
| 1,600,163 | A * | 9/1926 | Burns | ........................ E02B 9/00 405/75 |
| 2014/0270965 | A1* | 9/2014 | Igel, V | ....................... E02B 9/02 405/53 |

\* cited by examiner

*Primary Examiner* — Tara M. Pinnock
(74) *Attorney, Agent, or Firm* — Muncy, Geissler, Olds & Lowe, P.C.

(57) ABSTRACT

A hydroelectric power generating apparatus includes a check dam mounted on a hilltop portion of a hillside to accumulate water of a river reach, a power generating device mounted on a hill bottom portion of the hillside to be driven by a kinetic energy carried by the water for power generation, a diversion pipe extending from the check dam to the power generating device and having at least one diversion duct which extends along the river reach to make a pipeline that converts gravitational potential energy of the water into the kinetic energy, and a surge tank disposed to stand uprightly from the diversion duct for balancing pressure in the diversion duct.

8 Claims, 5 Drawing Sheets

HYDROELECTRIC POWER GENERATING APPARATUS

CROSS-REFERENCE TO RELATED APPLICATION

This application claims priority of Taiwanese Patent Application No. 105116616, filed on May 27, 2016.

FIELD

The disclosure relates to a hydroelectric power generating apparatus, and more particularly to a hydroelectric power generating apparatus that is adapted to be mounted on a hillside to utilize the natural downward flow of waters to capture the kinetic energy carried by the waters.

BACKGROUND

Hydroelectric power generating systems that utilize a water turbine to convert the energy of flowing water into mechanical energy for producing electric energy have been known. Conventional systems are built as water passes through a dam, and into a river below to place the water turbine in the dam for flow of water therethrough. Rivers generate large kinetic energy due to a high head drop when water flowing downward a hillside. It is desired to provide a hydroelectric power generating apparatus that can use the natural downward flow of rivers along a hillside to capture the kinetic energy carried by the river water.

SUMMARY

Therefore, an object of the disclosure is to provide a hydroelectric power generating apparatus that can utilize high kinetic energy of a river generated as a result of downward flowing of water along a hillside.

According to the disclosure, the hydroelectric power generating apparatus is adapted to be mounted on a hillside for power generation through a river reach along the hillside. The hillside has a hilltop portion and a hill bottom portion. The hydroelectric power generating apparatus includes a check dam adapted to be mounted on the hilltop portion to define a reservoir for water in the river reach, a power generating device, a diversion pipe and a surge tank. The power generating device is adapted to be mounted on the hill bottom portion, and includes a turbine unit which is driven by a kinetic energy carried by the water to generate a torque, and a generator unit which is disposed to receive the torque to generate electric energy. The diversion pipe extends from the check dam to the power generating device, and has an upper portion which is disposed adjacent to the check dam and which permits flow of the water from the check dam thereinto, a lower portion which is disposed adjacent to the power generating device, and at least one diversion duct which extends from the upper portion to the lower portion so as to make a pipeline that convert gravitational potential energy of the water into the kinetic energy. The surge tank is disposed to stand uprightly from the diversion duct to permit flow of the water thereinto for balancing pressure in the diversion duct.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
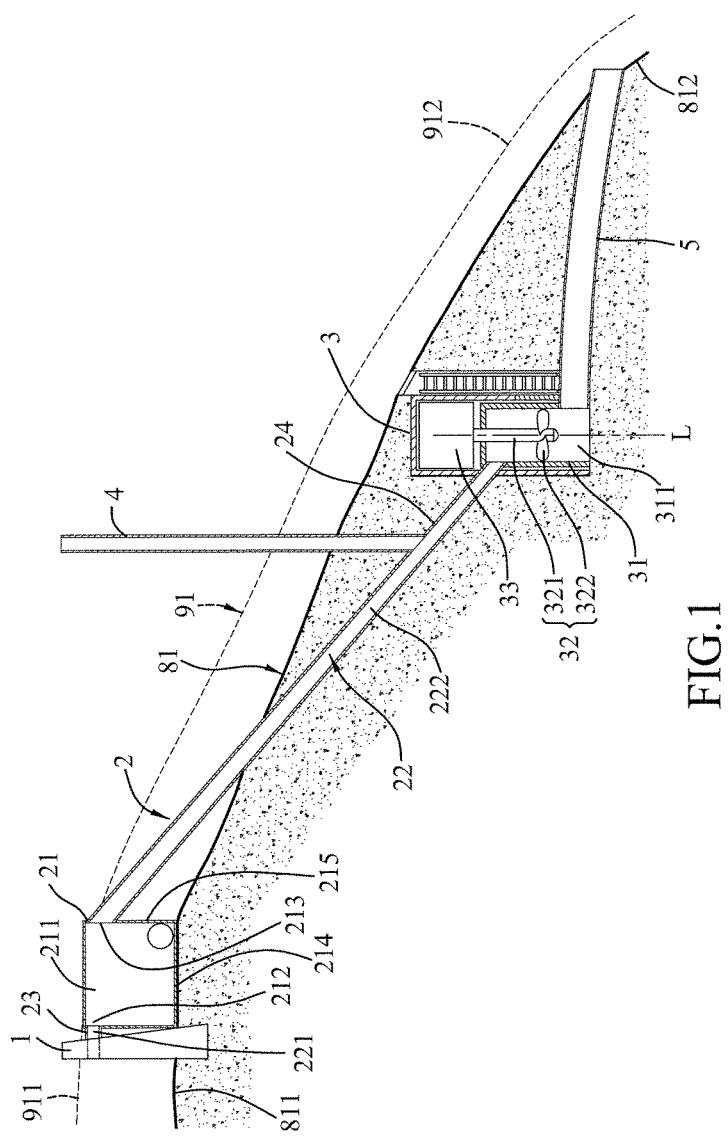
FIG. 1 is a schematic sectional view illustrating an embodiment of a hydroelectric power generating apparatus according to the disclosure when mounted on a hillside.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
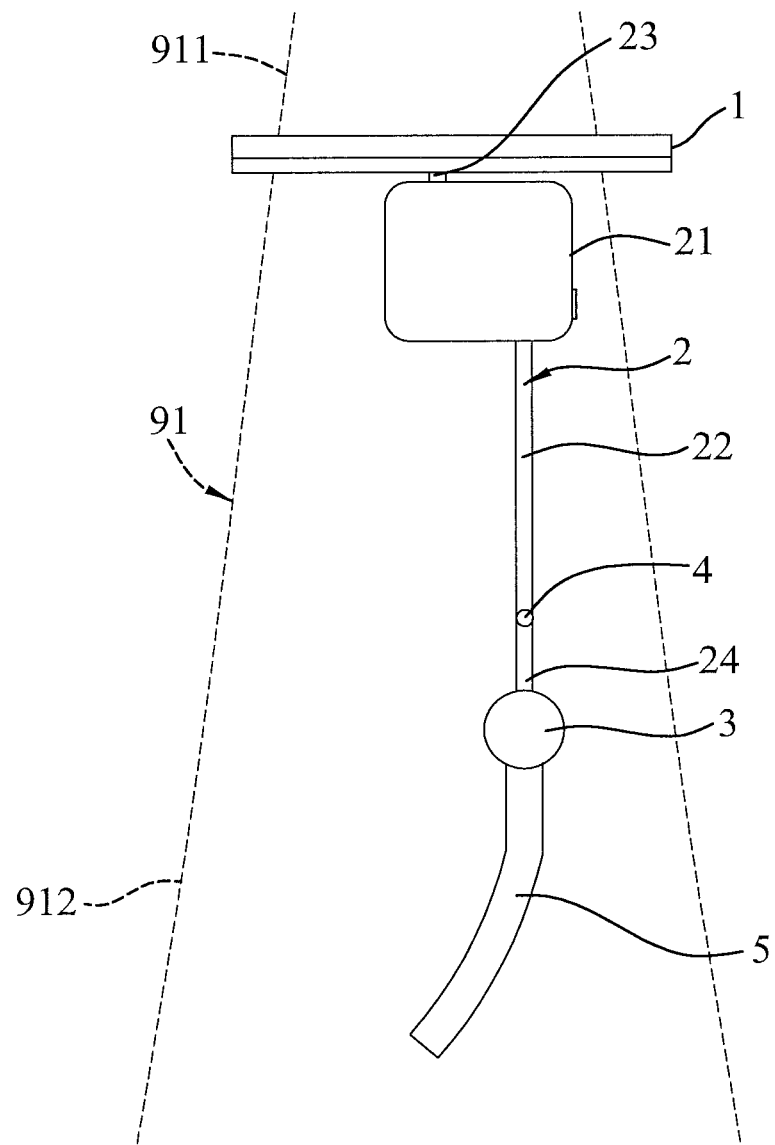
FIG. 2 is a schematic top view of the embodiment.

Referring to FIGS. 1 and 2, an embodiment of a hydroelectric power generating apparatus according to the disclosure is mounted on mounted on a hillside 81 for power generation through a river reach 91 along the hillside 81. The hillside 81 has a hilltop portion 811 and a hill bottom portion 812. In this embodiment, the hillside 81 is a natural geographic hill, and the hilltop portion 811 has a height level higher than that of the hill bottom portion 812. The height difference between the hilltop portion 811 and the hill bottom portion 812 is determined by the slope and length of the hillside 81. The river reach 91 is a length of a naturally-formed river which extends along the slope of the hillside 81 from the hilltop portion 811 toward the hill bottom portion 812 to have an upstream end 911 at the hilltop portion 811 and a downstream end 912 at the hill bottom portion 812.

The hydroelectric power generating apparatus includes a check dam 1, a power generating device 3, a diversion pipe 2, a settling basin 21, a surge tank 4 and a tailwater channel 5. The check dam 1 is mounted on the hilltop portion 811, ranges from 1 m to 30 m in height to impound water in the river reach 91, and cooperates with the hillside 81 to define a reservoir for storage of water in the river reach 91.

The power generating device 3 is mounted on the hill bottom portion 812, and includes an axial tube 31 which extends uprightly and surrounds an axis (L) to define an accommodation chamber 311, a turbine unit 32 which is disposed in the accommodation chamber 311 to be driven by the water flowing from the diversion pipe 2, and a generator unit 33 which is driven by the turbine unit 32 to generate electric energy.

The turbine unit 32 includes a spindle 321 which extends along and is rotatable about the axis (L), and a turbine impeller 322 which is disposed on the spindle 321 to be actuated by a kinetic energy carried by the water flow in the accommodation chamber 311 to rotate the spindle 321 in a certain rotational direction so as to generate a torque. For example, the axial tube 31 and the turbine unit 32 are formed as an axial-flow reaction turbine. In various embodiments, the turbine unit 32 may be a Francis turbine, a diagonal turbine, a tubular turbine, an impulse turbine, or that disclosed in Taiwanese Application No. 105203154, which utilizes water pressure to drive rotation of the turbine unit 32. The generator unit 33 is coupled with an upper end of the spindle 321 to convert the torque into the electric energy. Since the generator unit 33 is of a known type, a description is dispensed with herein.

The diversion pipe 2 extends from the check dam 1 to the power generating device 3, and has an upper portion 23 which is connected with the check dam 1 and which permits flow of the water from the check dam 1 thereinto, a lower portion 24 which is connected with the axial tube 31 of the power generating device 3 and which is lower than the upper portion 23, and a diversion duct 22 which extends from the upper portion 23 to the lower portion 24 so as to make a pipeline that converts gravitational potential energy of the water into the kinetic energy. The diversion pipe 2 is a high-pressure steel pipe to withstand high water pressure in the pipe 2. The diversion pipe 2 may be made from glass fibre, carbon fibre, concrete or ceramic material. In this embodiment, the diversion pipe 2 extends along a slope of the hillside 81, and is partly embedded in the hillside 81 to be retained firmly by overburden pressure, to reinforce the structure of the pipe 2 against the water pressure, and to avoid being damaged by rolling rocks and mud during flood season.

The settling basin 21 is disposed on the hilltop portion 811 and adjacent to the check dam 1, and has a bottom 214 and an enclosure wall 215 which surrounds and extends from the bottom 214 upwardly to define a settling chamber 211 for sediments. In this embodiment, the settling chamber 211 is placed at the pipeline of the diversion duct 22 to divide the diversion duct 22 into an upstream section 221 which is disposed downstream of the check dam 1 and upstream of the settling chamber 211, and a downstream section 222 which is disposed downstream of the settling chamber 211 and upstream of the power generating device 3. The settling chamber 211 has an inlet port 212 which is disposed in the enclosure wall 215 and which is communicated with the upstream section 221, and an outlet port 213 which is disposed in the enclosure wall 215 and which is communicated with the downstream section 222. The settling chamber 211 has a cross-section which is normal to the pipeline of the diversion pipe 2 and which is larger than those of both the inlet port 212 and the outlet port 213. An extending line of the inlet port 212 and the outlet port 213 intersects the water flowing path from the upstream section 221 to the downstream section 222. With the settling basin 21, the velocity of water flowing from the upstream section 221 into the settling chamber 211 is significantly reduced to facilitate sedimentation.

The surge tank 4 is tubular, and is disposed to stand uprightly from the diversion duct 22 and adjacent to the lower portion 24 to permit flow of the water thereinto for balancing pressure in the diversion duct 22. The height of the surge tank 4 is determined by an analysis result of the water hammer effect and head loss. Specifically, when the power generating device 3 is shut down to stop entrance of water from the diversion pipe 2 due to malfunction or for maintenance, the water continues to flow into the diversion pipe 2 and a sudden rise of pressure is generated in the diversion pipe 2. The pressure can be converted into gravitational potential energy by the surge tank 4 where the water passes into the surge tank 4 and the water level rises, which absorbs the rise of pressure to avoid breakage of the diversion pipe 2.

The tailwater channel 5 extends horizontally to intercommunicate the accommodation chamber 311 of the axial tube 31 and the downstream end 912 of the river reach 91 to discharge tailwater from the accommodation chamber 311 to the river reach 91. In this embodiment, the tailwater channel 5 is round tubular, and may be embedded in the hillside 81.

In mounting of the hydroelectric power generating apparatus, the check dam 1 is mounted across the upstream end 911 of the river reach 91 to accumulate part of river water and permit part of river water to flow therethrough. The diversion pipe 2 extends along the river reach 91 and is embedded in the hillside 81. Thus, the water flowing along the diversion pipe 2 generates kinetic energy from the gravitational potential energy.

The water running in the diversion pipe 2 through the check dam 1 continues to flow in the settling chamber 211 for sedimentation while the flow velocity is reduced due to the increased cross-section of the chamber 211. Sediments are deposited on the bottom 214 of the settling basin 21.

Next, the water flows through the outlet port 213 into the downstream section 222 to convert the gravitational potential energy into the kinetic energy, and then flows into the axial tube 31 to rotate the turbine unit 32 so as to generate the torque. The torque is received by the generator unit 33 to produce the electric energy. Finally, the water passing through the turbine unit 32 continues flowing into the tailwater channel 5 to be discharged to the downstream end 912 of the river reach 91.

Accordingly, with the diversion pipe 2 which is disposed and extends along the hillside 81, the hydroelectric power generating apparatus of this disclosure can use the high kinetic energy of a river generated from the natural downward flow of water along a hillside to drive the power generating device 3 for power generation.

Figure 3:
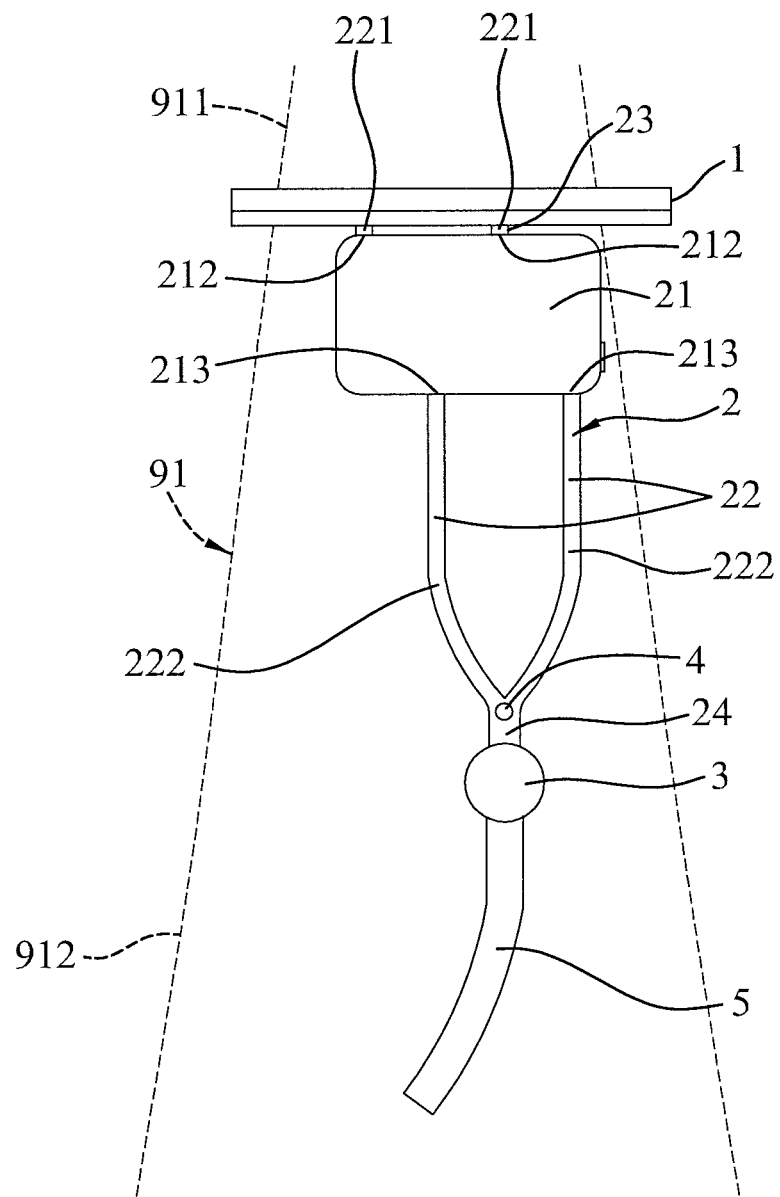
FIG. 3 is a schematic top view of another embodiment of a hydroelectric power generating apparatus according to the disclosure.

Referring to FIG. 3, in another embodiment, the diversion pipe 2 may have two diversion ducts 22 which respectively have the downstream sections 222 that are converged toward each other to terminate at a juncture. Also, the settling basin 21 has two inlet ports 212 each communicated with the upstream section 221 of the respective diversion duct 22, and two outlet ports 213 each communicated with the downstream section 222 of the respective diversion duct 22. The surge tank 4 is mounted at and stands uprightly from the juncture of the downstream sections 222. With the additional diversion duct 22, the amount of water flow in the diversion pipe 2 is increased. In this embodiment, the apparatus can be employed with a high-flow river reach 91. Thus, the number of the diversion ducts 22 may be more than two in accordance with the flow of the river reach 91.

Figure 4:
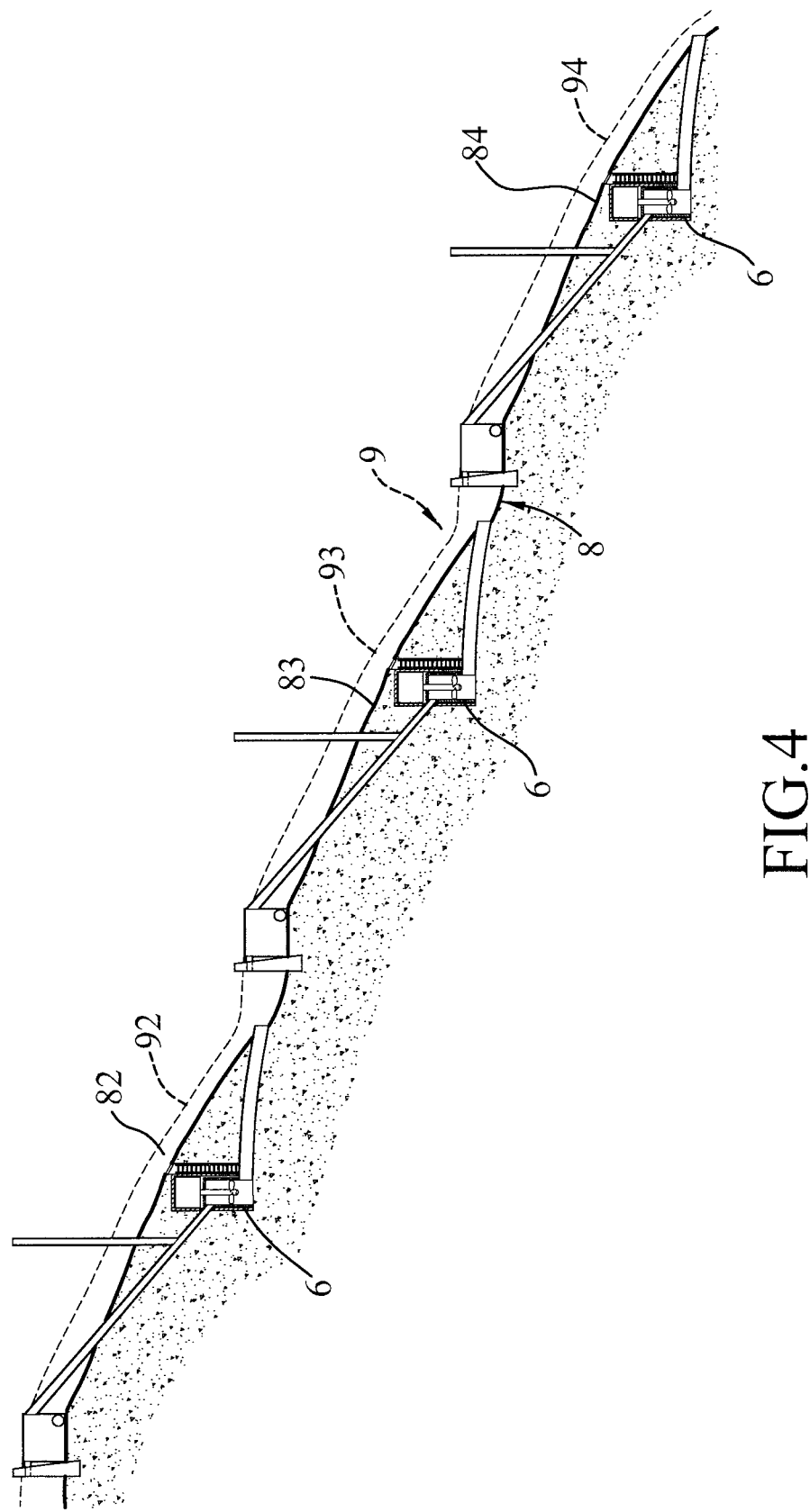
FIG. 4 is a schematic sectional view illustrating a plurality of the hydroelectric power generating apparatuses mounted on a hillside.
Figure 5:
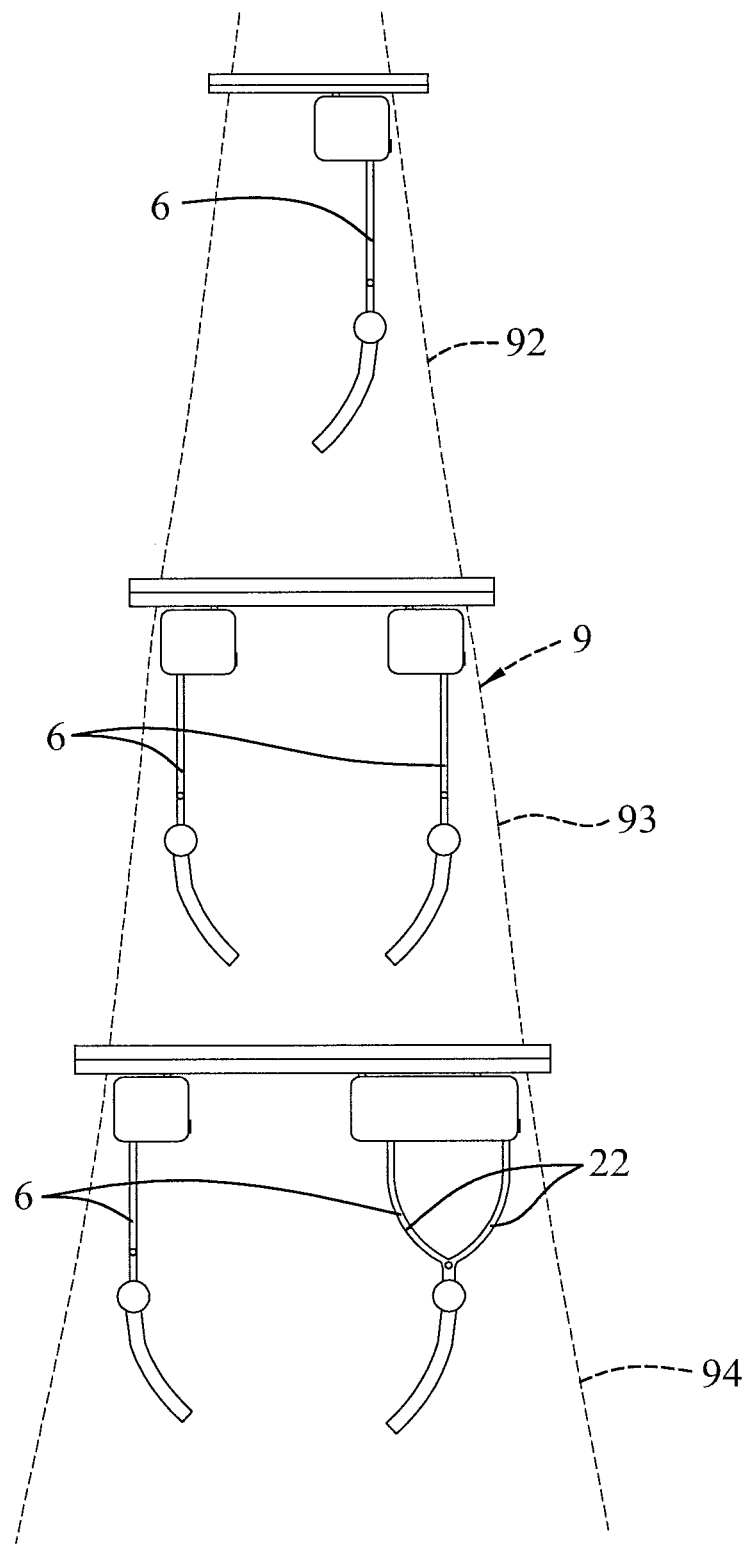
FIG. 5 is a schematic top view illustrating the hydroelectric power generating apparatuses mounted on the hillside.

Referring to FIGS. 4 and 5, in another embodiment, a plurality of the hydroelectric power generating apparatuses according to the disclosure are mounted on a mountainside or a hillside 8, and along a river 9. For example, the mountainside 8 has upper, middle and lower hillside sections 82, 83, 84. The river 9 has upper, middle and lower river reaches 92, 93, 94. Each of the hillside sections 82, 83, 84 and each of the river reaches 92, 93, 94 have the same configurations as those described hereinbefore.

FIG. 5 illustrates five of the hydroelectric power generating apparatuses 6 are mounted on the mountainside 8. Specifically, one of those is mounted on the upper hillside section 82, two of those are mounted on the middle hillside section 83 in a side-by-side arrangement, and the other two of those are mounted on the lower hillside section 84 in a side-by-side arrangement. The hydroelectric power generating apparatus 6 mounted on the upper hillside section 82 can generate electric power through the water in the upper river reach 92, and the tailwater is discharged back to the upper river reach 92. Next, the water of the upper river reach 92 flows to the middle river reach 93. The hydroelectric power generating apparatuses 6 mounted on the middle hillside section 83 can generate electric power through the water in the middle river reach 93, and the tailwater is discharged back to the middle river reach 93. Then, the water of the middle river reach 93 flows to the lower river reach 94. The hydroelectric power generating apparatuses 6 mounted on the lower hillside section 84 can generate electric power through the water in the lower river reach 94, and the tailwater is discharged back to the lower river reach 94.

Generally, the flow of the upper river reach 92 is relatively low such that only one apparatus 6 is employed, while the flow of each of the middle and lower river reaches 93, 94 is relatively high such that two apparatuses 6 are employed. One of the apparatuses 6 at the lower river reach 94 has two diversion ducts 22 for increasing the amount of water flow.

With such structure, the hydroelectric power generating apparatus of this disclosure can be disposed, and the configuration and a total number of the hydroelectric power generating apparatus can be designed in accordance with rivers of different flow speeds and mountainsides of different slopes and profiles. Hence, the natural downward flow of the rivers can be sufficiently utilized for power generation through the hydroelectric power generating apparatus. Since a river may have tributaries of different dimensions aside from amain river stream, multiple the hydroelectric power generating apparatuses of this disclosure can be distributed and arranged in the main river stream and the tributaries of the river as a massive hydropower resource development system.

It is noted that the number of the hillside sections 82, 83, 84 of the mountainside 8 (such as two, four or more) and the number of the river reaches 92, 93, 94 of the river 9 (such as two, four or more) may be varied such that the number of the hydroelectric power generating apparatuses 6 may be varied (such as two, three, four, six or more) in accordance with the slopes of the hillside sections 82, 83, 84 and the amount of water flow in the river reaches 92, 93, 94.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hydroelectric power generating apparatus adapted to be mounted on a hillside for power generation through a river reach along the hillside, the hillside having a hilltop portion and a hill bottom portion, comprising:
    a check dam adapted to be mounted on the hilltop portion to define a reservoir for water in the river reach;
    a power generating device adapted to be mounted on the hill bottom portion, and including a turbine unit which is driven by a kinetic energy carried by the water to generate a torque, and a generator unit which is disposed to receive the torque to generate electric energy;
    a diversion pipe extending from said check dam to said power generating device, and having an upper portion which is disposed adjacent to said check dam and which permits flow of the water from said check dam thereinto, a lower portion which is disposed adjacent to said power generating device, and at least one diversion duct which extends from said upper portion to said lower portion so as to make a pipeline that converts gravitational potential energy of the water into the kinetic energy; and
    a surge tank disposed to stand uprightly from said diversion duct to permit flow of the water thereinto for balancing pressure in said diversion duct.

2. The hydroelectric power generating apparatus as claimed in claim 1, further comprising a settling basin which is disposed adjacent to said check dam and which defines therein a settling chamber that is in communication with said diversion duct.

3. The hydroelectric power generating apparatus as claimed in claim 2, wherein said diversion duct has an upstream section which is disposed downstream of said check dam and upstream of said settling chamber, and a downstream section which is disposed downstream of said settling chamber and upstream of said power generating device, said settling chamber having an inlet port which is communicated with said upstream section, and an outlet port which is communicated with said downstream section, said settling basin having a bottom and an enclosure wall which surrounds and extends from said bottom upwardly to define said settling chamber, said inlet port and said outlet port being disposed in said enclosure wall.

4. The hydroelectric power generating apparatus as claimed in claim 3, wherein said settling basin is disposed adjacent to said upper portion, and said surge tank is disposed adjacent to said lower portion.

5. The hydroelectric power generating apparatus as claimed in claim 4, wherein said diversion pipe has two of said diversion ducts.

6. The hydroelectric power generating apparatus as claimed in claim 4, wherein said diversion pipe is partly embedded in the hillside and extends along a slope of the hillside.

7. The hydroelectric power generating apparatus as claimed in claim 4, wherein said power generating device includes an axial tube which extends uprightly and surrounds an axis to define an accommodation chamber that is disposed downstream of said lower portion, said turbine unit being disposed in said accommodation chamber, and including a spindle which is rotatable about the axis, and a turbine impeller which is disposed on said spindle to be actuated by the water flow in said accommodation chamber to rotate said spindle so as to generate the torque, said generator unit being coupled with an upper end of said spindle to convert the torque into electric energy.

8. The hydroelectric power generating apparatus as claimed in claim 7, wherein the river reach extends along the slope of the hillside from the hilltop portion toward the hill bottom portion to have an upstream end at the hilltop portion and a downstream end at the hill bottom portion, said hydroelectric power generating apparatus further comprising a tailwater channel which extends to intercommunicate said accommodation chamber of said axial tube and the downstream end of the river reach to discharge tailwater from said accommodation chamber to the river reach.

\* \* \* \* \*